Aug. 21, 1951      C. B. LINN      2,564,910
PROCESS FOR CONCENTRATING HYDROFLUORIC ACID
Filed Feb. 28, 1947
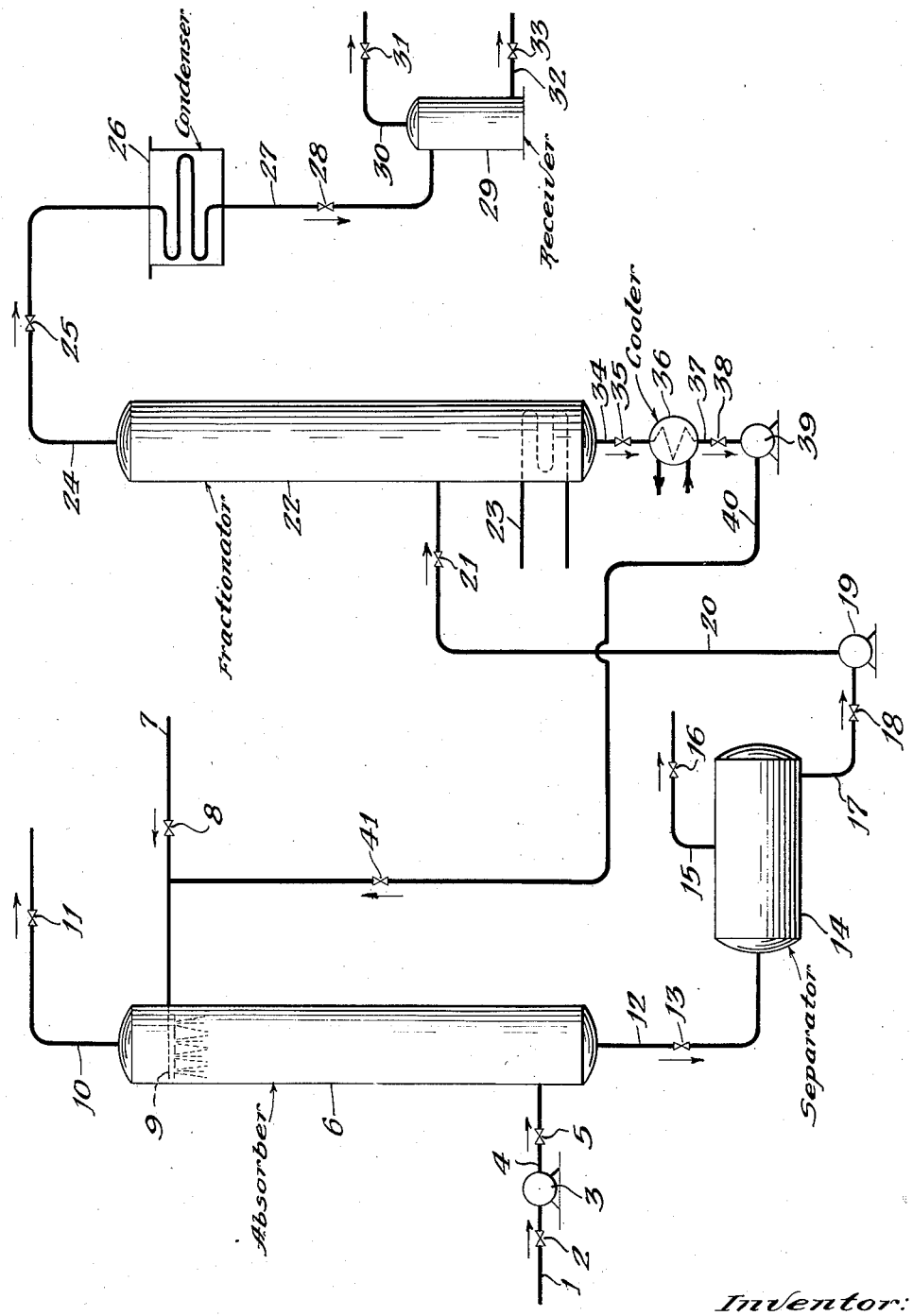
Inventor:
Carl B. Linn
By Maynard P. Venema
Attorney Patented Aug. 21, 1951

2,564,910

UNITED STATES PATENT OFFICE 2,564,910

PROCESS FOR CONCENTRATING HYDROFLUORIC ACID

Carl B. Linn, Riverside, Ill., assignor to Universal Oil Products Company, Chicago, Ill., a corporation of Delaware Application February 28, 1947, Serial No. 731,730

11 Claims. (Cl. 23—153)

This invention relates to a method for concentrating hydrofluoric acid from aqueous solutions of hydrogen fluoride and particularly from a constant boiling mixture of hydrogen fluoride and water.

An object of this invention is to produce hydrofluoric acid of higher hydrogen fluoride concentration from an aqueous solution of hydrogen fluoride.

Another object of this invention is to produce hydrofluoric acid of from about 90 to about 100% hydrogen fluoride concentration from the hydrogen fluoride-water azeotrope.

One specific embodiment of this invention relates to a process for concentrating hydrofluoric acid which comprises contacting an aqueous hydrofluoric acid with a polyfluoro-hydrocarbon, separating a solution comprising essentially polyfluoro-hydrocarbon and dissolved hydrofluoric acid from an aqueous solution containing less hydrogen fluoride than the hydrofluoric acid charged to the process, separating the first named solution into hydrofluoric acid and recovered polyfluoro-hydrocarbon, recovering said hydrofluoric acid, and recycling the recovered polyfluoro-hydrocarbon to contact with the aqueous hydrofluoric acid charged to the process.

Another embodiment of this invention relates to a process for concentrating hydrofluoric acid which comprises contacting an aqueous hydrofluoric acid with a fluorocarbon, separating a solution comprising essentially a fluorocarbon and dissolved hydrofluoric acid from an aqueous solution containing less hydrogen fluoride than the hydrofluoric acid charged to the process, separating the first named solution into hydrofluoric acid and recovered fluorocarbon, recovering said hydrofluoric acid, and recycling the recovered fluorocarbon to contact with the aqueous hydrofluoric acid charged to the process.

A further embodiment of this invention relates to a process for concentrating hydrofluoric acid which comprises countercurrently contacting an aqueous hydrofluoric acid and a fluorocarbon, separating a solution comprising essentially fluorocarbon and dissolved hydrofluoric acid from an aqueous solution containing less hydrogen fluoride than the hydrofluoric acid charged to the process, separating the first named solution into hydrofluoric acid and recovered fluorocarbon, recovering said hydrofluoric acid and recycling the recovered fluorocarbon to contact with the aqueous hydrofluoric acid charged to the process.

The process for concentrating hydrogen fluoride is effected by taking advantage of the immiscibility of a liquid fluorocarbon with water and with aqueous solutions of hydrogen fluoride and the relatively higher solubility of hydrogen fluoride in said fluorocarbon.

Simple fractional distillation can be used to produce anhydrous hydrogen fluoride from hydrofluoric acid of a hydrogen fluoride concentration higher than that of the constant boiling mixture with water which contains about 38% by weight of hydrogen fluoride, but heretofore no simple method has been available for concentrating hydrogen fluoride from its constant boiling aqueous solution which has a boiling point of 111° C. at a pressure of one atmosphere. By my process substantial enrichment of hydrogen fluoride relative to water is obtained by extracting an aqueous solution of hydrogen fluoride with a fluorocarbon. The fluorocarbon employed in this process is preferably a liquid at a temperature of 20° C. and at a pressure of one atmosphere absolute but other fluorocarbons with lower boiling points are utilizable by carrying out the process under a super-atmospheric pressure. The removal of hydrogen fluoride from an aqueous hydrofluoric acid solution is carried out by extracting the aqueous solution with a fluorocarbon and recovering from the fluorocarbon the extracted hydrogen fluoride. This process may be carried out as a liquid-liquid extraction at a temperature as low as the freezing point of the aqueous hydrogen fluoride solution that is extracted by the fluorocarbon. Depending upon the exact temperature and fluorocarbon used it may be necessary to carry out the extraction at a super-atmospheric pressure in order to maintain the fluorocarbon in substantially liquid phase. It is preferable to carry out the extraction at the autogenous pressure developed by the fluorocarbon and hydrogen fluoride present in the hydrogen fluoride concentrating system, although higher pressures may also be used. Constant boiling hydrofluoric acid freezes at about −35° C. while some of the fluorocarbons are liquid at even lower temperatures although those of higher molecular weights are solid at room temperature. The freezing points of hydrogen fluoride-water mixtures other than the constant boiling mixture may be obtained from the approximately straight line curve obtained by plotting the composition versus freezing point based upon the above indicated values and the freezing point of pure water.

Fluorocarbons which are utilizable in my process comprise the substantially saturated flurocarbons which include completely fluorinated paraffins and cycloparaffins sometimes also referred to as perfluoroparaffins and perfluorocycloparaffins. A series of fluorocarbons corresponding to the paraffinic hydrocarbons has the general formula $C_nF_{2n+2}$ which is analogous to the general formula $C_nH_{2n+2}$ of the paraffinic hydrocarbons. Of the completely fluorinated paraffins, those having from 3 to 12 carbon atoms per molecule are preferred solvents for extracting hydrogen fluoride from its aqueous solutions. In addition to the fluorocarbons which contain only carbon and fluorine, there are other polyfluorinated hydrocarbons and polyfluorochlorohydrocarbons, such as trifluorobenzene or dichlorohexafluoropropane which are suitable for concentrating hydrogen fluoride from its aqueous solutions, either the constant boiling solution or one containing more or less hydrogen fluoride than present in its constant boiling aqueous solution.

A few of the physical properties of some of the completely fluorinated paraffins are given in the following table:

TABLE

*Some fluorocarbons and their properties*

| Formula of Fluorocarbons | Melting Point °C. | Boiling Point °C. (760 mm.) | Density at °C. | |
|---|---|---|---|---|
| $C_3F_8$ | −183 | −38 | 1.45 | 0.2 |
| $C_4F_{10}$ | −84 | −4.7 | 1.53 | 0.2 |
|  |  |  | 1.59 | 8.8 |
|  |  |  | 1.47 | 20.8 |
| $C_5F_{12}$ | −10 | 30 | ---- | ---- |
| $C_6F_{14}$ | −4 | 60 | ---- | ---- |

Other saturated fluorocarbons suitable for use in my process comprise completely fluorinated cycloparaffins, such as completely fluorinated cyclopentane, cyclohexane, dimethylcyclohexane, etc. Completely fluorinated cyclopentane which is also referred to as decafluorocyclopentane has a melting point of about −12° C., a boiling point of 23° C., and a density of 1.72 at 0.2° C., 1.69 at 8.8° C., and 1.67 at 20.8° C. Similarly completely fluorinated cyclohexane, $C_6F_{12}$, also referred to as decafluorocyclohexane boils at 51° C. and has a density of 1.65 at 0.2° C., 1.63 at 8.8° C., and 1.60 at 20.8° C. Also completely fluorinated dimethylcyclohexane which is sometimes referred to as perfluorodimethylcyclohexane has the general formula $C_8F_{16}$. These different completely fluorinated paraffins and cycloparaffins which may also be referred to as saturated fluorocarbons have boiling points very near to or slightly higher or lower than those of the hydrocarbons with corresponding carbon structures.

The use of my method makes it possible to recover hydrofluoric acid of higher hydrogen fluoride concentration from aqueous solutions and sludges that previously could not be concentrated economically and that contained sufficient hydrogen fluoride to present serious disposal problems. These dilute solutions and sludges could be neutralized with caustic soda or by other means but the resultant sodium fluoride is also difficult to dispose of because of hazards to public health, fish, game, etc., if these wastes are dumped where they may reach rivers, lakes, and other sources of water supplies.

My method for concentrating hydrofluoric acid from aqueous solutions of hydrogen fluoride is illustrated in the attached diagrammatic drawing which shows one method by which the process may be carried out.

An aqueous solution of hydrogen fluoride such as constant boiling hydrofluoric acid is introduced through line 1 and valve 2 to pump 3 which discharges through line 4 and valve 5 into the lower part of absorber 6 which may comprise a vertically disposed cylindrical vessel provided with baffles, screens, or other suitable mixing devices. The aqueous hydrofluoric acid is then passed upwardly through absorber 6 wherein it is contacted with a fluorocarbon introduced from an outside source through line 7 and valve 8 and also recycled from line 40 as hereinafter set forth to distributor 9 located in the upper section of absorber 6. In absorber 6, the fluorocarbon, which is immiscible with the aqueous solution and in which hydrogen fluoride is more soluble than in water, is introduced near the top of said absorber and passes downwardly therethrough countercurrent to the aqueous hydrogen fluoride introduced near the bottom of absorber 6. The aqueous solution of hydrofluoric acid from which a substantial proportion of the hydrogen fluoride is removed by the descending fluorocarbon is discharged from the top of absorber 6, through line 10 and valve 11 to waste or to other use or recovery treatment not indicated in the diagrammatic drawing.

The fluorocarbon containing dissolved hydrogen fluoride is withdrawn from the bottom of absorber 6 through line 12 and valve 13 to separator 14 which comprises a settling tank or other suitable equipment in which the solution of hydrogen fluoride in the fluorocarbon is permitted to settle and to separate from small amounts of aqueous hydrogen fluoride solution that may be admixed therewith or entrained therein when removed from the bottom of absorber 6. The aqueous solution of hydrogen fluoride being lighter than and immiscible with the fluorocarbon layer containing dissolved hydrogen fluoride is withdrawn from separator 14 through line 15 and valve 16 to waste or to other treatment not indicated in the diagrammatic drawing.

From the bottom of separator 14, the fluorocarbon containing dissolved hydrogen fluoride is withdrawn through line 17 and valve 18 by pump 19 which discharges through line 20 and valve 21 into fractionator 22 provided with reboiler coil 23. In fractionator 22 the fluorocarbon containing dissolved hydrogen fluoride is subjected to distillation or desorption treatment to separate dissolved hydrogen fluoride from the fluorocarbon solvent. Hydrogen fluoride vapors evolved in fractionator 22 are directed therefrom through line 24 and valve 25 to condenser 26 and from thence the mixture of liquid and vapor is directed through rundown line 27 and valve 28 to receiver 29 provided with gas release line 30 containing valve 31 and with liquid drawoff line 32 containing valve 33. From receiver 29, the hydrofluoric acid so concentrated by the process of this invention may be withdrawn and utilized as catalyst for hydrocarbon conversion reactions or for other purposes.

Sometimes the material collected in receiver 29 may also contain a certain amount of fluorocarbon. In such cases two liquid layers will be present in receiver 29, that is, an upper layer consisting of hydrogen fluoride or a hydrogen fluoride-water mixture more concentrated than that charged to absorber 6 and a lower fluorocarbon layer, the latter being suitable for recycling to absorber 6 by means not indicated in the drawing.

The fluorocarbon solvent from which hydrogen fluoride is removed in fractionator 22 is withdrawn from the bottom of fractionator 22 through line 34 and valve 35 to cooler 36 from which the fluorocarbon cooled to the temperature needed for absorbing hydrogen fluoride from the aqueous solution in absorber 6 is directed through line 37 and valve 38 to pump 39 which discharges through line 40, valve 41, and line 7 already mentioned into distributor 9 located in the upper portion of absorber 6.

If desired, the fluorocarbon containing dissolved hydrogen fluoride may be subjected to hydrogen fluoride desorption treatment at substantially the same temperature as employed in absorber 6. This type of desorption is accomplished by operating fractionator 22 at lower pressure than that employed in absorber 6. For example, absorber 6 may be operated at a temperature of from about 10° to about 20° C. and at a pressure of from about 2 to about 10 atmospheres to effect absorption in a fluorocarbon of hydrofluoric acid containing 90 to 100% hydrogen fluoride and desorption of the dissolved hydrofluoric acid is effected in fractionator 22 also at a temperature of from about 10° to about 20° C. but at an absolute pressure of about 0.5 atmosphere or less. When operating in this manner, the fluorocarbon from which absorber hydrofluoric acid has been removed need not be cooled before being recycled to absorber 6 as hereinabove set forth.

My process for concentrating hydrofluoric acid from its aqueous solutions such as constant boiling aqueous hydrofluoric acid or hydrofluoric acid containing a smaller concentration of hydrogen fluoride than that present in the constant boiling mixture may thus be carried out in a continuous manner using a fluorocarbon, a mixture of fluorocarbons, poly-fluorinated hydrocarbons, a poly fluoro-poly chlorohydrocarbon or a chlorofluorocarbon as solvent for extracting hydrofluoric acid of high hydrogen fluoride concentration from aqueous hydrogen fluoride.

The process of this invention is illustrated further by the following example which should not be misconstrued to limit unduly the broad scope of the invention.

One volume of a liquid perfluoroheptane, $C_7F_{16}$, is contacted thoroughly with one volume of aqueous hydrofluoric acid containing 36% by weight of hydrogen fluoride at a temperature of 20° C. and at a pressure of one atmosphere absolute in a copper-lined steel vessel. The resultant commingled mixture is passed to a settling chamber from which is removed the heavier perfluoroheptane fraction containing dissolved hydrogen fluoride. The aqueous layer withdrawn next from the settling chamber and containing a relatively low percentage of hydrogen fluoride is subjected to fractional distillation removing sufficient water to form a residue of constant boiling aqueous hydrogen fluoride which is subjected to further treatment in the process to extract hydrogen fluoride therefrom.

The fluorocarbon layer which is withdrawn from the settling chamber is distilled and essentially pure hydrogen fluoride is distilled overhead and collected. The perfluoroheptane from which the dissolved hydrogen fluoride is removed by distillation is then contacted with an additional quantity of aqueous hydrofluoric acid containing 36% by weight of hydrogen fluoride to effect the concentration of a further quantity of hydrofluoric acid.

The nature of the present invention is evident from the preceding specification and example, although neither section should be misconstrued to limit unduly the broad scope of the invention.

I claim as my invention:

1. A process for concentrating hydrofluoric acid which comprises contacting an aqueous hydrofluoric acid with a polyfluoro-hydrocarbon, separating a solution comprising essentially polyfluoro-hydrocarbon and dissolved hydrofluoric acid from an aqueous solution containing less hydrogen fluoride than the hydrofluoric acid charged to the process, separating the first named solution into hydrofluoric acid and recovered polyfluoro-hydrocarbon, recovering said hydrofluoric acid, and recycling the recovered polyfluoro-hydrocarbon to contact with the aqueous hydrofluoric acid charged to the process.

2. A process for concentrating hydrofluoric acid which comprises contacting an aqueous hydrofluoric acid with a fluorocarbon, separating a solution comprising essentially a fluorocarbon and dissolved hydrofluoric acid from an acqueous solution containing less hydrogen fluoride than the hydrofluoric acid charged to the process, separating the first named solution into hydrofluoric acid and recovered fluorocarbon, recovering said hydrofluoric acid, and recycling the recovered fluorocarbon to contact with the aqueous hydrofluoric acid charged to the process.

3. A process for concentrating hydrofluoric acid which comprises countercurrently contacting an aqueous hydrofluoric acid with a fluorocarbon, separating a solution comprising essentially a fluorocarbon and dissolved hydrofluoric acid from an aqueous solution containing less hydrogen fluoride than the hydrofluoric acid charged to the process, separating the first named solution into hydrofluoric acid and recovered fluorocarbon, recovering said hydrofluoric acid, and recycling the recovered fluorocarbon to contact with the acqueous hydrofluoric acid charged to the process.

4. A process for concentrating hydrofluoric acid which comprises contacting constant boiling aqueous hydrofluoric acid and a fluorocarbon in liquid phase, separating a solution comprising essentially said fluorocarbon and dissolved hydrofluoric acid from an aqueous solution containing less hydrogen fluoride than constant boiling hydrofluoric acid, separating the first named solution into hydrofluoric acid and recovered fluorocarbon, recovering said hydrofluoric acid, and recycling the recovered fluorocarbon to futher contact with the constant boiling aqueous hydrofluoric acid charged to the process.

5. A method for concentrating hydrofluoric acid from its constnat boiling mixture with water which comprises contacting said constant boiling mixture with a liquid fluorocarbon to form an upper less-concentrated hydrofluoric acid layer, and a lower layer comprising essentially a solution of hydrogen fluoride in said fluorocarbon, separating the layers, and fractionally distilling the lower layer to obtain a distillate comprising essentially hydrofluoric acid of higher hydrogen fluoride concentration than constant boiling hydrofluoric acid.

6. A method for concentrating hydrofluoric acid from its constant boiling mixture with water which comprises continuously and countercurrently contacting said constant boiling mixture with a liquid fluorocarbon to form an upper less-concentrated hydrofluoric acid layer and a lower layer comprising essentially a solution of hydrogen fluoride in said fluorocarbon, continuously separating the layers, continuously fractionally distilling the lower layer to obtain a distillate comprising essentially hydrofluoric acid of higher hydrogen fluoride concentration than constant boiling hydrofluoric acid and a residue of recovered fluorocarbon, and recycling said recovered fluorocarbon to further contact with the constant boiling hydrofluoric acid charged to the process.

7. A method for concentrating hydrofluoric acid from its constant boiling mixture with water which comprises continuously and countercurrently contacting said constant boiling mixture with a liquid fluorocarbon to form an upper less-concentrated hydrofluoric acid layer and a lower layer comprising essentially a solution of hydrogen fluoride in said fluorocarbon, continuously separating the layers, continuously fractionally distilling the lower layer to obtain a distillate comprising essentially a hydrofluoric acid of from about 90 to about 100% hydrogen fluoride concentration and a residue of recovered fluorocarbon and recycling said recovered fluorocarbon to further contact with the constant boiling hydrofluoric acid charged to the process.

8. A method for concentrating hydrofluoric acid from its constant boiling mixture with water which comprises continuously and countercurrently contacting said constant boiling mixture with a liquid perfluoroparaffin to form an upper less-concentrated hydrofluoric acid layer and a lower layer comprising essentially a solution of hydrogen fluoride in said perfluoroparaffin, continuously separating the layers, continuously fractionally distilling the lower layer to obtain a distillate comprising essentially a hydrofluoric acid of from about 90 to about 100% hydrogen fluoride concentration and a residue of recovered perfluoroparaffin and recycling said recovered perfluoroparaffin to further contact with the constant boiling hydrofluoric acid charged to the process.

9. A method for concentrating hydrofluoric acid from its constant boiling mixture with water which comprises continuously and countercurrently contacting said constant boiling mixture with a liquid perfluoroheptane to form an upper less-concentrated hydrofluoric acid layer and a lower layer comprising essentially a solution of hydrogen fluoride in said perfluoroheptane, continuously separating the layers, continuously fractionally distilling the lower layer to obtain a distillate comprising essentially a hydrofluoric acid of from about 90 to 100% hydrogen fluoride concentration and a residue of recovered perfluoroheptane, and recycling said recovered perfluoroheptane to further contact with the constant boiling hydrofluoric acid charged to the process.

10. A process for concentrating hydrofluoric acid which comprises contacting an aqueous hydrofluoric acid with a polyfluoro-hydrocarbon, separating a solution comprising essentially polyfluoro-hydrocarbon and dissolved hydrofluoric acid from an aqueous solution containing less hydrogen fluoride than the hydrofluoric acid charged to the process, separating the first named solution into hydrofluoric acid and polyfluoro-hydrocarbon, and recovering the last-mentioned hydrofluoric acid.

11. A process for concentrating hydrofluoric acid which comprises contacting an aqueous hydrofluoric acid with a fluorocarbon, separating a solution comprising essentially a fluorocarbon and dissolved hydrofluoric acid from an aqueous solution containing less hydrogen fluoride than the hydrofluoric acid charged to the process, separating the first named solution into hydrofluoric acid and fluorocarbon, and recovering the last-mentioned hydrofluoric acid.

CARL B. LINN.

REFERENCES CITED

The following references are of record in the file of this patent:

UNITED STATES PATENTS

| Number | Name | Date |
| --- | --- | --- |
| 2,384,449 | Benning et al. | Sept. 11, 1945 |
| 2,388,156 | Kelley | Oct. 30, 1945 |
| 2,423,045 | Passino | June 24, 1947 |
| 2,456,027 | Simons | Dec. 14, 1948 |
| 2,458,551 | Benning et al. | Jan. 11, 1949 |
| 2,462,402 | Joyce | Feb. 22, 1949 |
| 2,466,189 | Waalkes | Apr. 5, 1949 |

OTHER REFERENCES

"Fluorine Chemistry," reprint from the Industrial and Eng. Chemistry and Analytical Chemistry, March 1947, pages 239–241, 368–370.